(12) United States Patent
Mawhinney et al.

(10) Patent No.: US 6,556,540 B1
(45) Date of Patent: Apr. 29, 2003

(54) SYSTEM AND METHOD FOR NON-INTRUSIVE MEASUREMENT OF SERVICE QUALITY IN A COMMUNICATIONS NETWORK

(75) Inventors: Ted N. Mawhinney, Clearwater, FL (US); Richard A. Mundwiler, Safety Harbor, FL (US)

(73) Assignee: Paradyne Corporation, Largo, FL (US)

( * ) Notice: Subject to any disclaimer, the term of this patent is extended or adjusted under 35 U.S.C. 154(b) by 0 days.

(21) Appl. No.: 09/321,137

(22) Filed: May 27, 1999

Related U.S. Application Data

(60) Provisional application No. 60/087,217, filed on May 29, 1998.

(51) Int. Cl.[7] .............................. H04J 1/16; H04J 3/14
(52) U.S. Cl. ...................... 370/229; 370/394; 370/428
(58) Field of Search ................. 370/229, 232, 370/389, 412, 394, 395.1, 230, 231, 235, 236, 428, 429, 395.4–395.43; 709/234, 235

(56) References Cited

U.S. PATENT DOCUMENTS

| | | | | |
|---|---|---|---|---|
| 5,317,563 A | * | 5/1994 | Oouchi | 370/17 |
| 5,521,907 A | * | 5/1996 | Ennis, Jr. | 370/17 |
| 5,740,173 A | * | 4/1998 | Fiorini | 370/394 |
| 5,805,602 A | * | 9/1998 | Cloutier | 370/516 |
| 5,867,483 A | * | 2/1999 | Ennis, Jr. | 370/252 |

* cited by examiner

*Primary Examiner*—Ajit Patel
*Assistant Examiner*—Chirag Shah
(74) *Attorney, Agent, or Firm*—Thomas, Kayden, Horstemeyer & Risley LLP

(57) ABSTRACT

A network monitoring system and method is provided for determining service quality over a packet switching network. In one embodiment, the system comprises a processor coupled to a local interface, a memory coupled to the local interface, and operating logic stored in the memory, the operating logic being executed by the processor. The operating logic includes network management logic which comprises logic to poll a transmit buffer in a transmit probe for a number of transmit pattern identifiers, the transmit pattern identifiers being generated from a stream of data packets at a transmit side of a packet switching network. The network management logic also comprises logic to poll a receive buffer in a receive probe for a number of receive pattern identifiers, the receive pattern identifiers being generated from the stream of data packets at a receive side of the packet switching network. Finally, the network management logic includes logic to compare the transmit pattern identifiers with the receive pattern identifiers to identify at least one dropped data packet from the stream of data packets in the packet switching network.

15 Claims, 6 Drawing Sheets

SYSTEM AND METHOD FOR NON-INTRUSIVE MEASUREMENT OF SERVICE QUALITY IN A COMMUNICATIONS NETWORK

CROSS REFERENCE TO RELATED APPLICATION

This document claims priority to and the benefit of the filing date of co-pending and commonly assigned provisional application entitled "Method for Non-intrusive Detection and Measurement of Dropped Frames in a Communications Network", assigned serial No. 60/087,217, filed May 29, 1998, and hereby incorporated by reference.

TECHNICAL FIELD

The present invention relates generally to data communications, and more particularly, to a system and method for the non-intrusive measurement of service quality over a communications network.

BACKGROUND OF THE INVENTION

Historically, in the field of data communications, a modem, a data service unit (DSU), or a channel service unit (CSU) has been used to convey information from one location to another. Digital technology now enables modems and other communication devices, such as frame relay data service units (DSU's) and frame relay access units (FRAU's) to communicate large amounts of data at higher speeds. The communication scheme employed by these devices generally adheres to a model, known as the Open Systems Interconnect (OSI) Seven-Layer model. This model specifies the parameters and conditions under which information is formatted and transferred over a given communications network. A general background of the OSI seven-layer model follows.

In 1978, a framework of international standards for computer network architecture known as "OSI" (Open Systems Interconnect) was developed. The OSI reference model of network architecture consists of seven layers. From the lowest to the highest, the layers are: (1) the physical layer; (2) the datalink layer; (3) the network layer; (4) the transport layer; (5) the session layer; (6) the presentation layer; and (7) the application layer. Each layer uses the layer below it to provide a service to the layer above it. The lower layers are implemented by lower level protocols which define the electrical and physical standards, perform the byte ordering of the data, and govern the transmission, and error detection and correction of the bit stream. The higher layers are implemented by higher level protocols which deal with, inter alia, data formatting, terminal-to-computer dialogue, character sets, and sequencing of messages.

Layer 1, the physical layer, controls the direct host-to-host communication between the hardware of the end users' data terminal equipment (e.g., a modem connected to a PC).

Layer 2, the datalink layer, generally fragments the data to prepare it to be sent on the physical layer, receives acknowledgment frames, performs error checking, and re-transmits frames which have been incorrectly received.

Layer 3, the network layer, generally controls the routing of packets of data from the sender to the receiver via the datalink layer, and it is used by the transport layer. An example of the network layer is the Internet Protocol (IP), which is the network layer for the TCP/IP protocol widely used on Ethernet networks. In contrast to the OSI seven-layer architecture, TCP/IP (Transmission Control Protocol over Internet Protocol) is a five-layer architecture which generally consists of the network layer and the transport layer protocols.

Layer 4, the transport layer, determines how the network layer should be used to provide a point-to-point, virtual, error-free connection so that the end point devices send and receive uncorrupted messages in the correct order. This layer establishes and dissolves connections between hosts. It is used by the session layer. TCP is an example of the transport layer.

Layer 5, the session layer, uses the transport layer and is used by the presentation layer. The session layer establishes a connection between processes on different hosts. It handles the creation of sessions between hosts as well as security issues.

Layer 6, the presentation layer, attempts to minimize the noticeability of differences between hosts and performs functions such as text compression, and format and code conversion.

Layer 7, the application layer, is used by the presentation layer to provide the user with a localized representation of data which is independent of the format used on the network. The application layer is concerned with the user's view of the network and generally deals with resource allocation, network transparency and problem partitioning.

The communications networks that operate within the OSI seven-layer model include a number of paths or links that are interconnected to route voice, video, and/or digital data (hereinafter, collectively referred to as "data") traffic from one location of the network to another. At each location, an interconnect node couples a plurality of source nodes and destination nodes to the network. In some cases, the sources and destinations are incorporated in a private line network that may include a series of offices connected together by leased-lines with switching facilities and transmission equipment owned and operated by the carrier or service provider and leased to the user. This type of network is conventionally referred to as a "circuit-switching network". Accordingly, a source node of one office at one location of the network may transmit data to a destination node of a second office located at another location of the network through their respective switching facilities.

At any given location, a large number of source nodes may desire to communicate through their respective switching facilities, or interconnect node, to destination nodes at various other locations of the network. The data traffic from the various source nodes is first multiplexed through the source switching facility, and then demultiplexed at the destination switching facility, and finally delivered to the proper destination node. A variety of techniques for efficiently multiplexing data from multiple source nodes onto a single circuit of the network are presently employed in private line networks. For instance, time division multiplexing (TDM) affords each source node full access to the allotted bandwidth of the circuit for a small amount of time. The circuit is divided into defined time segments, with each segment corresponding to a specific source node, to provide for the transfer of data from those source nodes, when called upon, through the network.

Some data communications systems may employ other techniques, including packet switching networks. Implementations of packet switching networks include, for example, Asynchronous Transfer Mode (ATM) networks that use fixed size packets referred to as "cells", or Frame-Relay networks. Packet-switching networks, as opposed to circuit-switching networks, allow multiple users to share data network facilities and bandwidth, rather than providing a specific amount of dedicated bandwidth to each user, as in TDM. Instead, packet switches divide bandwidth into connectionless, virtual circuits. Virtual circuits can be permanent virtual circuits (PVC's) or switched virtual circuits (SVC's). As is known, virtual circuit bandwidth is consumed only when data is actually transmitted. Otherwise, the bandwidth is not used. In this way, packet-switching networks essentially mirror the operation of a statistical multiplexer (whereby multiple logical users share a single network access circuit). Frame relay generally operates within layer 2 (the data link layer) of the OSI model, and is an improvement over previous packet switching techniques, such as the industry standard X.25, in that frame relay requires significantly less overhead.

In frame relay networks, as in all communication networks, access to the network is provided by a network service provider. These service providers generally provide the communication and switching facilities over which the above-mentioned communication devices operate. Typically, an end user desirous of establishing a communications network, provisions the network services in the form of a public switched service network. An example of a public switched network is the public switched telephone network (PSTN) or a public data network (PDN). These public networks typically sell network services, in the form of connectivity, to end users.

Typically a user of a public network will purchase a particular level of service from the network service provider. This level of service can be measured by, for example, network availability as a percentage of total time on the network, the amount of data actually delivered through the network compared to the amount of data attempted, or possibly the network latency, or the amount of time it takes for a particular communication to traverse the network.

One problem with current communication systems is that it is difficult for an end user to adequately determine whether the public network service provider is delivering the quality of service that the end user has contracted. This is because it is nearly impossible for an end user to adequately measure the level of service actually delivered by the public network.

SUMMARY OF THE INVENTION

In light of the foregoing, the present invention provides a system and method for nonintrusive measurement of service quality in a communications network that determines whether any data packet transmitted over a packet switching network has been dropped or has failed to reach its intended destination.

In accordance with one embodiment of the present invention, a system is provided that preferably comprises a processor coupled to a local interface, a memory coupled to the local interface, and operating logic stored in the memory, the operating logic being executed by the processor. The operating logic includes network management logic which comprises logic to poll a transmit buffer in a transmit probe for a number of transmit pattern identifiers, the transmit pattern identifiers being generated from a stream of data packets at a transmit side of a packet switching network. The network management logic also comprises logic to poll a receive buffer in a receive probe for a number of receive pattern identifiers, the receive pattern identifiers being generated from the stream of data packets at a receive side of the packet switching network. Finally, the network management logic includes logic to compare the transmit pattern identifiers with the receive pattern identifiers to identify at least one dropped data packet from the stream of data packets in the packet switching network.

In another embodiment, the present invention can also be viewed as providing a method for determining service quality over a packet switching network. In this regard, the method can be broadly summarized by the following steps: polling a transmit buffer in a transmit probe for a number of transmit pattern identifiers, the transmit pattern identifiers being generated from a stream of data packets at a transmit side of a packet switching network; polling a receive buffer in a receive probe for a number of receive pattern identifiers, the receive pattern identifiers being generated from the stream of data packets at a receive side of the packet switching network; and, comparing the transmit pattern identifiers with the receive pattern identifiers to identify whether any packets are dropped from the stream of data packets in the packet switching network.

The present invention may also be viewed as a network quality probe for generating a number of pattern identifiers for a number of data packets in a stream of data packets processed. In one embodiment, the network quality probe comprises a processor coupled to a local interface, a memory coupled to a local interface, probe logic stored on the memory and executed by the processor, the probe logic including logic to generate a pattern identifier for each of the data packets in the stream of data packets, and logic to store the pattern identifiers in a buffer.

The present invention provides an advantage in that the service quality of a virtual circuit over a packet switching network may be determined without altering the stream of data packets to be transmitted across the network itself.

Other features and advantages of the present invention will become apparent to one with skill in the art upon examination of the following drawings and detailed description. It is intended that all such additional features and advantages be included herein within the scope of the present invention.

BRIEF DESCRIPTION OF THE SEVERAL VIEWS OF THE DRAWINGS

The invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

DETAILED DESCRIPTION OF THE INVENTION

Figure 1:
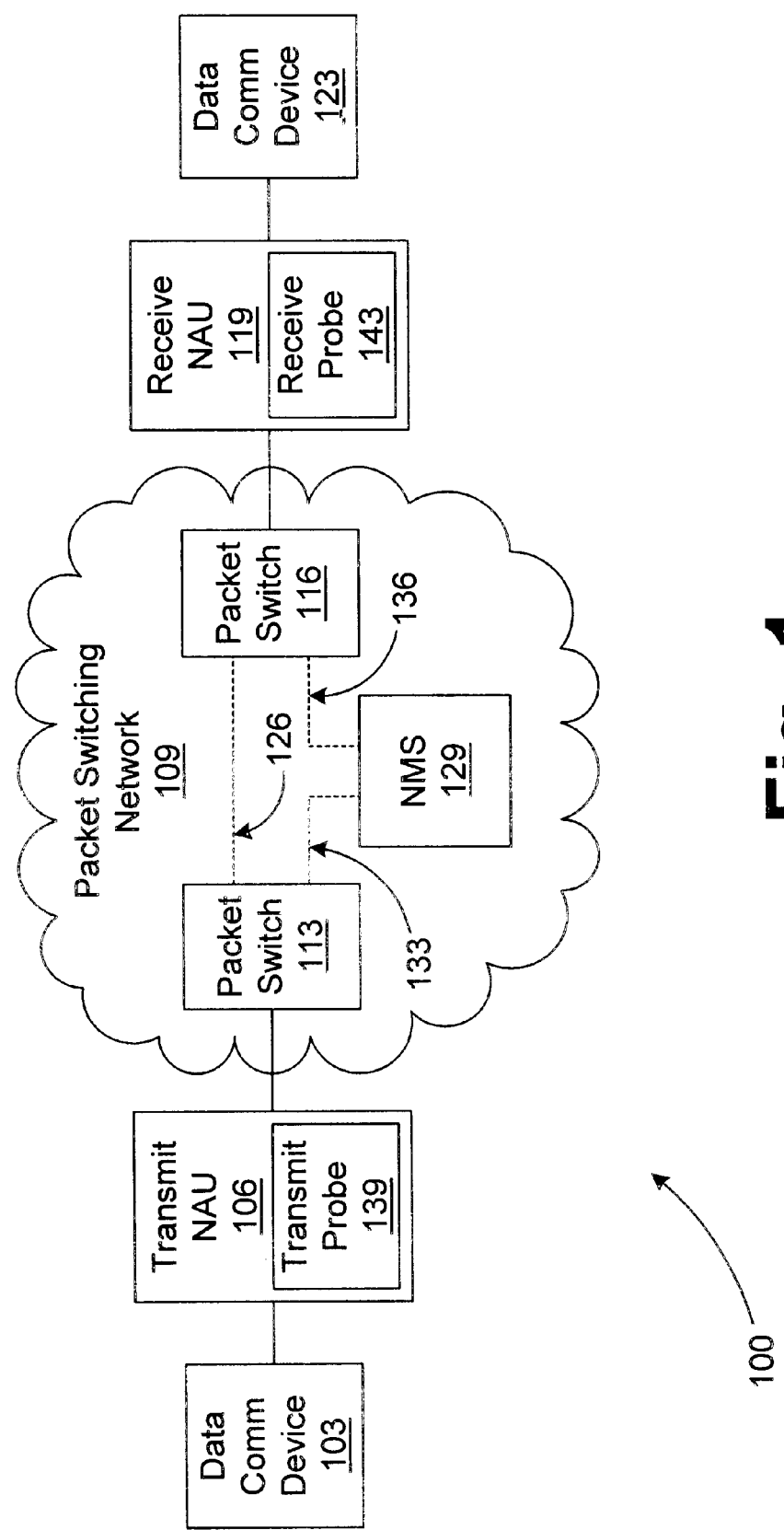
FIG. 1 is a functional block diagram of a data communications network according to an embodiment of the present invention.

With reference to FIG. 1, shown is a data communications network 100 according to an embodiment of the present invention. The data communications network 100 includes a first data communications device 103 that is coupled to a transmit network access unit (NAU) 106. The transmit NAU 106 is coupled to a packet switching network 109 via a transmit side packet switch 113. The packet switching network 109 also includes a receive side packet switch 116 that is coupled to a receive NAU 119. The receive NAU 119 is, in turn, coupled to a second data communications device 123.

The packet switches 113 and 116 are in data communication across the packet switching network 109 via one of a number of virtual circuits 126. The data communications system 100 also includes a network management system 129 that is in data communication with the transmit and receive NAUs 106 and 119 in one embodiment via the packet switches 113 and 116, and virtual circuits 133 and 136. The network management system 129 may be in data communication with the transmit and receive NAUs 106 and 119 via any one of a number of other approaches, including local area networks (LANs), wide area networks (WANs), or other suitable data communication links depending upon the specific application.

The transmit NAU 106 includes a transmit probe 139 that generates pattern identifiers for data packets that are transmitted through the transmit NAU 106. Likewise, the receive NAU 119 includes a receive probe 143 that generates pattern identifiers for data packets received by the receive NAU 119. The functionality of the transmit and receive probes 139 and 143 is discussed in detail in later text.

The packet switching network 109 may comprise any one of several types of packet switching networks, including frame relay networks and asynchronous transfer mode (ATM) networks, as well as other like networks. The packets transferred by the packet switching network 109 may be of fixed or variable length. For example, in an ATM network, the packets are comprised of cells of fixed length, whereas in frame relay networks, the packets are of a variable length. Accordingly, the transmit and receive NAUs 106 and 119 may be, for example, frame relay access units or ATM access units, depending upon the type of packet switching network 109. The data communications devices 103 and 123 may include computers, workstations, or any other device that may generate data to be communicated across the packet switching network 109 to a second such device.

Also, although only the transmit and receive packet switches 113 and 116 are shown, it is readily understood by those skilled in the art that the packet switching network 109 may include numerous such switches 113 and 116 that accommodate communication between many different data communications devices 103, 123. The NAUs 106 and 119 also may each accommodate multiple data communications devices 103, 123 as is understood by those skilled in the art.

Next, the general operation of the data communications network 100 is described. The first data communications device 103 generates data that is to be transmitted to the second data communications device 123 via the packet switching network 109. The first data communications device 103 provides the data to the transmit NAU 106 in the form of data packets that are transmitted in a data packet stream across the packet switching network 109. In the case that the packet switching network 109 is a frame relay network, for example, the data packets are data frames that may vary in length. In another example, if the packet switching network 109 is an ATM network, then the data packets are cells of a uniform length as prescribed by ATM protocol. The transmit probe 139 generates a transmit pattern identifier for each of the data packets transmitted by the transmit NAU 106. These transmit pattern identifiers generally comprise digital values that are stored in a transmit buffer in the transmit probe 139.

The stream of data packets is supplied to the transmit side packet switch 113 and thereafter are routed through the packet switching network 109 to the receive side packet switch 116 via the virtual circuit 126. The receive side packet switch 116 provides the stream of data packets to the receive NAU 119. The receive probe 143 within the receive NAU 119 generates a receive pattern identifier for each of the data packets received and stores these pattern identifiers in a receive buffer in the transmit probe. Note that the receive pattern identifiers for each data packet are generated in the same manner as the transmit pattern identifiers and, for a given packet, the two preferably are identical. Ultimately, other algorithms may be employed that provide translation between the transmit and receive pattern identifiers so that different values for each may be employed as well. The receive NAU 119 then supplies the data packets to the second data communication device 123.

The network management system 129 then periodically polls the transmit and receive buffers in the transmit and receive probes 139 and 143 and obtains both the transmit and receive pattern identifiers stored therein via the virtual circuits 133 and 136, or other data communications link. The network management system 129 then performs a comparison between the transmit and receive pattern identifiers to determine whether a particular data packet that was transmitted by the transmit NAU 106 was actually received by the receive NAU 119.

If the network management system 129 has obtained both transmit and receive pattern identifiers for a specific data packet from the transmit and receive buffers, then the data packet in question has successfully navigated the packet switching network 109. On the other hand, if the network management system 129 obtains only a transmit pattern identifier for a specific data packet without a corresponding receive pattern identifier, then it is assumed that the particular data packet was never received by the receive NAU 119, and presumably was dropped by the packet switching network 109. The network management system 129 tracks the number of data packets that have been dropped by the packet switching network 109. In one embodiment, each time a data packet was dropped by the packet switching network 109, the network management system 129 will increment a dropped packet counter to keep track of the number of dropped data packets. This information may then be obtained by the operator of the packet switching network 109 to access the overall error rate of the packet switching network 109.

Although the flow of the data communication in the data communications network 100 is depicted as unidirectional from the first data communication device 103 to the second data communication device 123, it should be noted that bidirectional data communications may be established by including both receive and transmit functionality in the various components discussed above. The present invention is discussed in terms of unidirectional data communication herein for purposes of clarity. In addition, the network management system 129 may actually poll transmit and receive probes 139 and 143 from a number of different transmit and receive NAUs 106 and 119 to monitor several different virtual paths at the same time if so desired.

Figure 2A:
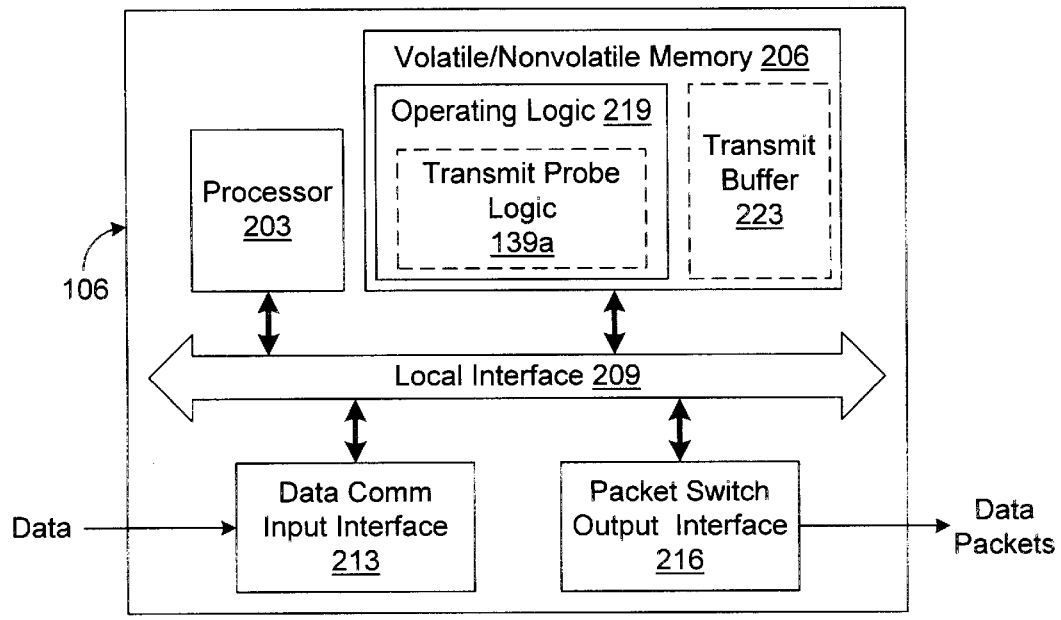
FIG. 2A is a block diagram of a transmit side network access unit employed in the data communications network of FIG. 1.

Turning to FIG. 2A, shown is a block diagram of the transmit NAU 106 according to an embodiment of the present invention. The transmit NAU 106 includes a processor 203 and a volatile/nonvolatile memory 206, both of which are coupled to a local interface 209. The transmit NAU 106 also includes a data communications input interface 213 and a packet switch output interface 216, both being coupled to the local interface 209 as well. The data communications input interface 213 makes data received from the first data communications device 103 (FIG. 1) available on the local interface 209. Likewise, the packet switch output interface 216 makes data on the local interface 209 available to the transmit side packet switch 113. The local interface 209 may include, for example, a data bus and a control bus to transfer data between the various components coupled thereto.

The transmit NAU 106 includes operating logic 219 stored on the memory 206. The operating logic 219 generally controls the operation of the transmit NAU 106, such operation including, for example, the switching of data packets received from the data communications device 103 (FIG. 1), etc. In a preferred embodiment of the present invention, the operating logic 219 includes transmit probe logic 139a. A portion of the memory 206 is dedicated for use as a transmit buffer 223.

Figure 2B:
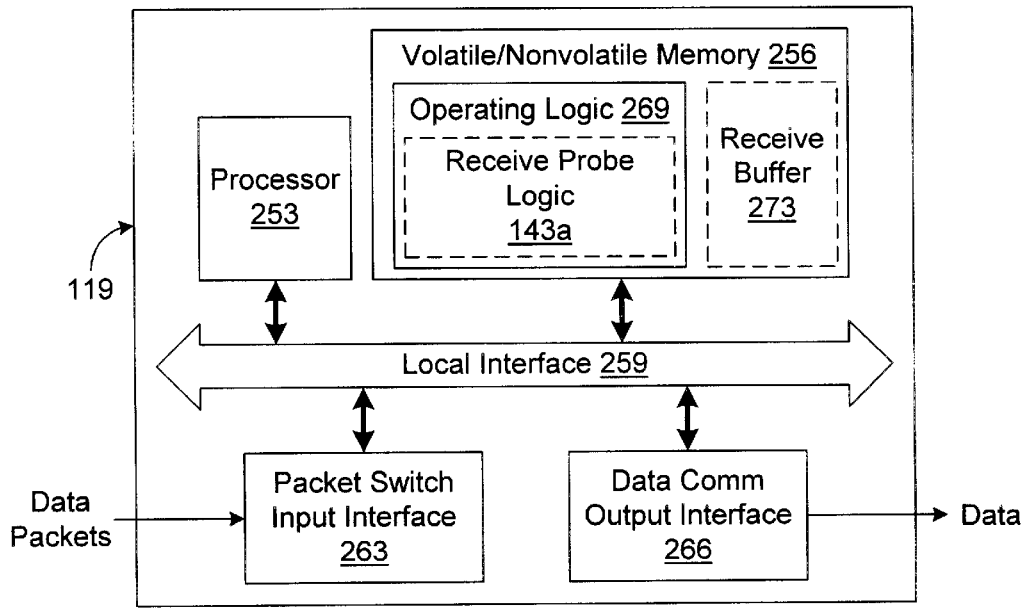
FIG. 2B is a block diagram of a receive side network access unit employed in the data communications network of FIG. 1.

With reference to FIG. 2B, shown is a block diagram of the receive NAU 119 according to an embodiment of the present invention. The receive NAU 119 includes a processor 253 and a volatile/nonvolatile memory 256, both of which are coupled to a local interface 259. The receive NAU 119 also includes a packet switch input interface 263 and a data communications output interface 266, both being coupled to the local interface 259 as well. The packet switch input interface 263 makes data received from the receive side packet switch 116 (FIG. 1) available on the local interface 259. Likewise, the data communications output interface 266 makes data on the local interface 259 available to the second data communications device 123. The local interface 259 may include, for example, a data bus and a control bus to transfer data between the various components coupled thereto.

The receive NAU 119 includes operating logic 269 stored on the memory 256. The operating logic 269 generally controls the operation of the receive NAU 119, such operation including, for example, the recovery of data from the data packets received from the receive side packet switch 116, etc. In a preferred embodiment of the present invention, the operating logic 269 includes receive probe logic 143a. A portion of the memory 256 is dedicated for use as a receive buffer 273.

Figure 3:
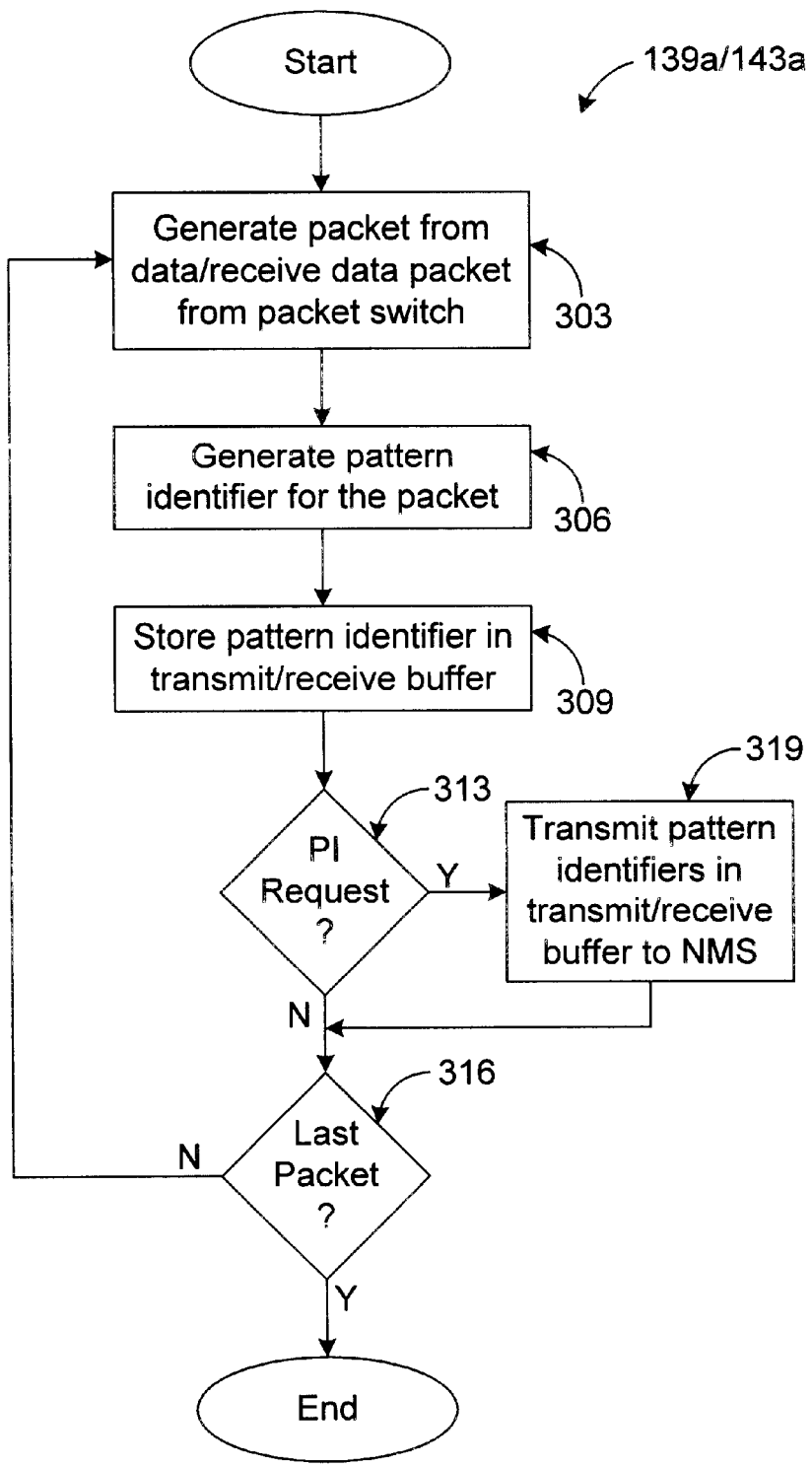
FIG. 3 is a flow chart of transmit and receive probe logic employed by the network access units of FIGS. 2A and 2B.

Referring to FIG. 3, shown is a flow chart of the transmit and receive probe logic (hereafter "probe logic") 139a/143a. Due to significant similarity, a single flow chart is shown for both the transmit and receive probe logic 139a and 143a, where differences in steps are pointed out as described below. The probe logic 139a/143a begins at block 303 where in the transmit probe logic 139a, a data packet is received from the first data communications device 103 (FIG. 1) via the data communications input interface 213 (FIG. 2). In block 303, the receive probe logic 143a receives a data packet from the receive side packet switch 116 (FIG. 1).

The probe logic 139a/143a then progresses to block 306 in which a pattern identifier is generated for the data packet that was previously generated/received. The probe logic 139a/143a may generate the pattern identifier, for example, by calculating a cyclic redundancy check across the entire data packet. However, any particular approach may be employed to mathematically hash the data in the data packet that provides a relatively unique identifier can be employed. Note that the number of unique pattern identifiers or the pattern identifier alphabet depends upon how many digits one wishes to use to represent the pattern identifiers. For example, if four binary digits are employed, then one of a total of sixteen different values may be generated for a specific data packet. The actual size of the pattern identifier alphabet is referred to herein as the identifier resolution and, being application specific, is specified by the user.

The probe logic 139a/143a then moves to block 309 in which the generated pattern identifier is stored in the transmit/receive buffer 223/273 (FIGS. 2A and 2B). Thereafter, in block 313, it is determined whether the network management system 129 (FIG. 1) has transmitted a request for the pattern identifiers stored in the transmit/receive buffer 223/273. If not, then the probe logic 139a/143a moves to block 316. If such a request has been received, then the probe logic 139a/143a progresses to block 319 in which the pattern identifiers stored in the transmit/receive buffer 223/273 are transmitted to the network management system 129. In one embodiment, the pattern identifiers transmitted are formed into a data packet that is routed to the network management system 129 via the packet switching network 109 (FIG. 1), although other data communications links and protocols may be employed. Thereafter, the probe logic 139a/143a moves to block 316. In block 316, the probe logic 139a/143a determines whether there are any more data packets to process. If the last data packet has not been processed, then the probe logic 139a/143a reverts back to block 303 to repeat the process. Otherwise, the probe logic 139a/143a ends and waits for further data packets.

Figure 4:
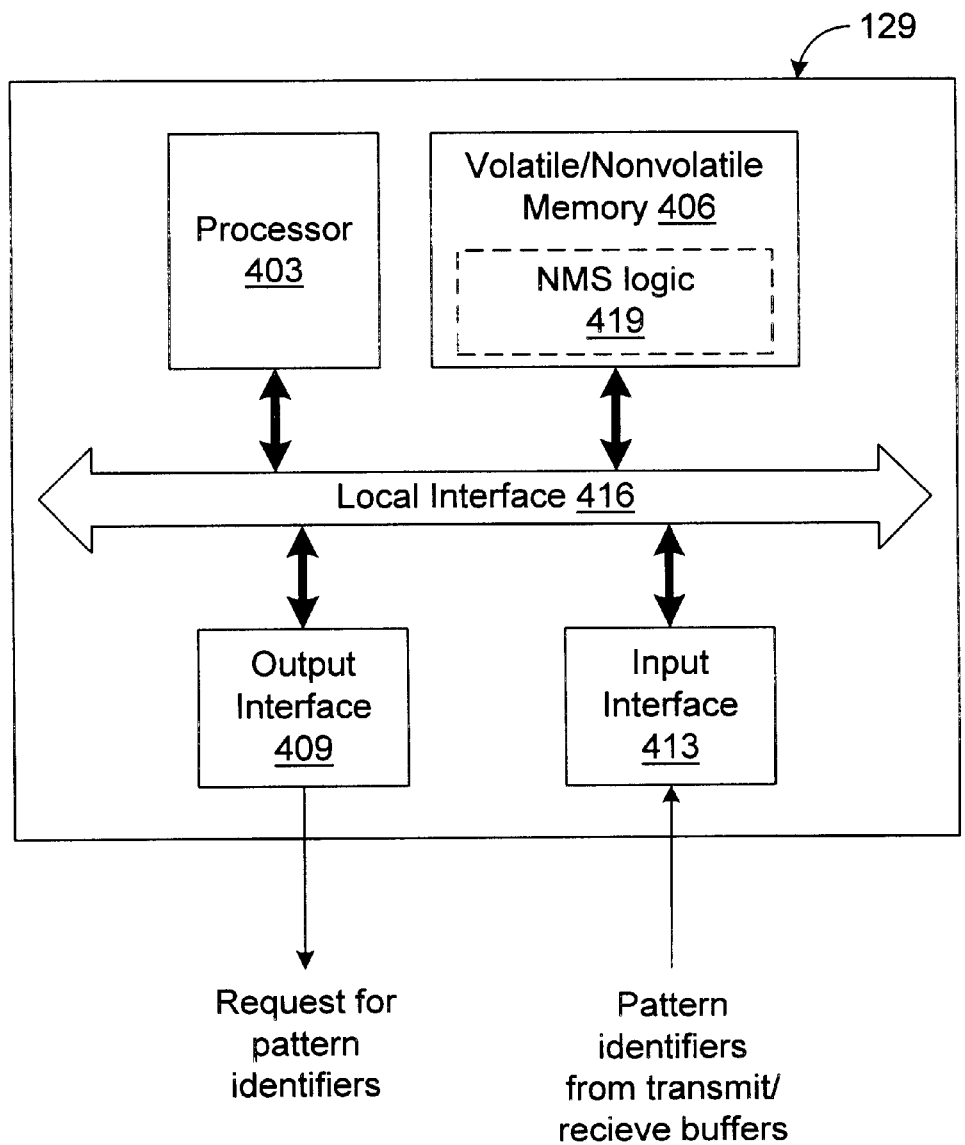
FIG. 4 is a block diagram of a network management system employed in the data communications network of FIG. 1.

With reference to FIG. 4, shown is a block diagram of the network management system 129 according to an embodiment of the present invention. The network management system 129 includes a processor 403, a volatile/non-volatile memory 406, an output interface 409, and an input interface 413, all of which are coupled to a local interface 416. The local interface 416 may include, for example, a data bus and a control bus. The output interface 409 allows data to be written from the local interface 416 to the packet switching network 109 where such data is routed to its ultimate destination that may be, for example, the transmit and receive NAUs 106 and 119 (FIG. 1). The input interface 413 allows data addressed to the network management system 129 transmitted via the packet switching network 109 to be made available on the local interface 416. Note that such data transmitted and received via the output and input interfaces is generally in the form of the data packets normally handled by the packet switching network 109.

Stored on the volatile/nonvolatile memory 406 is network management system (NMS) logic 419. The NMS logic 419 is executed by the processor 403 in performing the various tasks of the network management system 129.

Figure 5A:
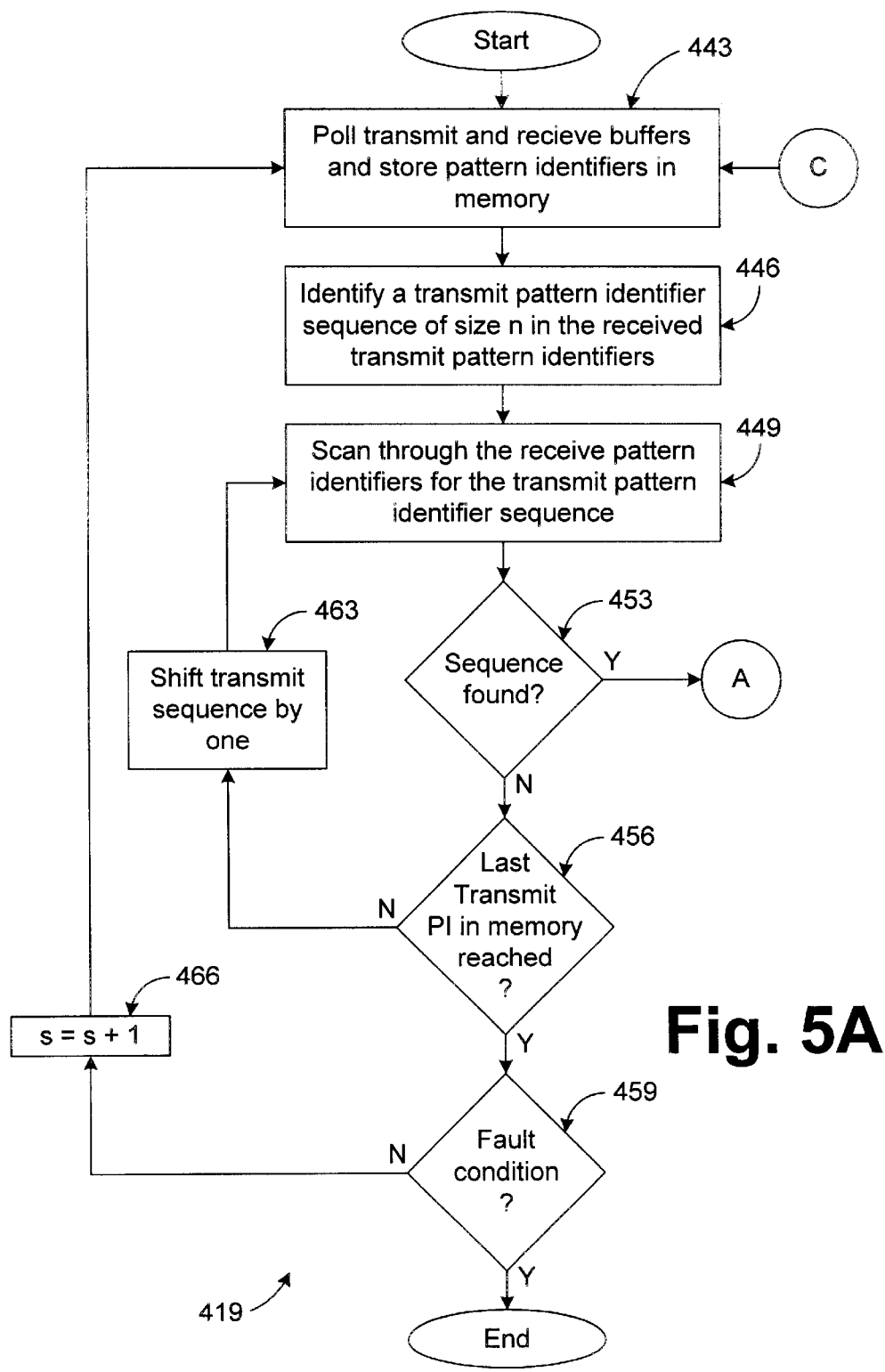
FIG. 5A is a first portion of a flow chart of the network management system logic employed in the network management system of FIG. 1.
Figure 5B:
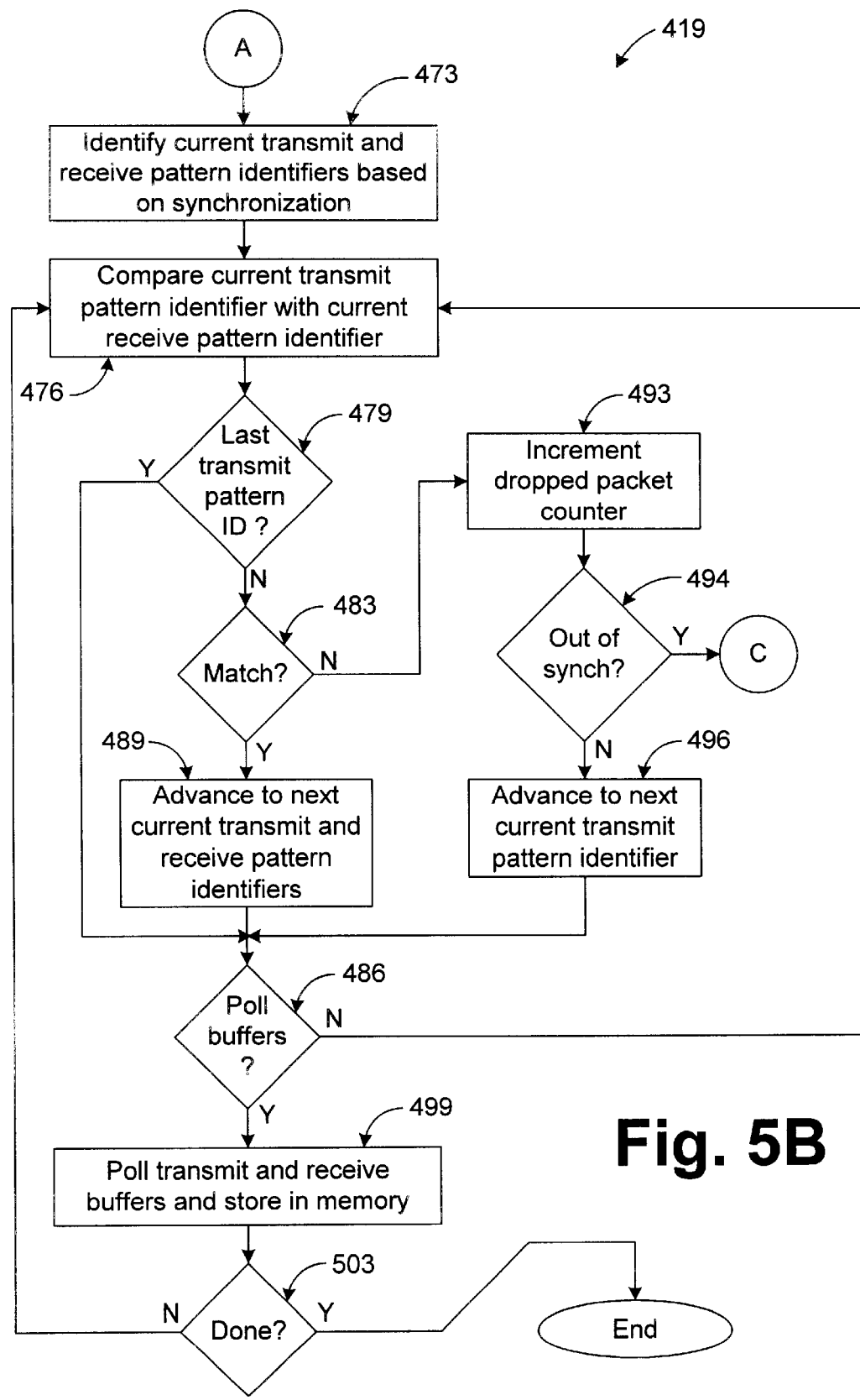
FIG. 5B is a second portion of the flow chart of the network management system logic employed in the network management system of FIG. 1.

Turning then, to FIGS. 5A and 5B, shown is a flow chart of the NMS logic 419 according to an embodiment of the present invention. The NMS logic 419 shown in FIG. 5A generally performs a synchronization function in which the transmit pattern identifiers and receive pattern identifiers received from the transmit and receive probes 139 and 143 (FIG. 1) are synchronized such that transmit and receive pattern identifiers generated from the same data packet are correlated. The NMS logic 419 begins with block 443 in which the network management system 129 polls the transmit buffer 223 (FIG. 2A) and receive buffer 273 (FIG. 2B) of the transmit and receive probes 139 and 143. This is done, for example, by transmitting an appropriate polling message to the transmit and receive probes 139 and 143 via the packet switching network 109. The pattern identifiers are then sent back to the network management system via the packet switching network 109 and are stored in the memory 419.

The NMS logic 419 then progresses to block 446 in which the pattern identifiers from the transmit buffer 223, or the transmit pattern identifiers, are examined and a sequence of consecutive transmit pattern identifiers (hereafter "transmit pattern identifier sequence") of size n is identified. The size n of the transmit pattern identifier sequence may be, for example, five or any other number, the actual value chosen being application specific. The value of the number n will determine the length of the sequence that is used to synchronize the transmit and receive pattern identifiers.

Next, in block 449 the NMS logic 419 scans through the receive pattern identifiers obtained from the receive buffer 273 to find a sequence that matches the transmit pattern identifier sequence. Assuming that the data packets represented by the transmit pattern identifier sequence are all received in order by the receive probe 143, then an identical sequence should be found in the receive pattern identifiers. In block 453 it is determined whether the transmit pattern identifier sequence has been found among the receive pattern identifiers. If so, then the NMS logic 419 proceeds to connector A that continues in FIG. 5B. If not, then the NMS logic 419 moves to block 456 in which it is determined whether the transmit pattern identifier sequence is at the end of the list of available transmit pattern identifiers stored in the memory 406 (FIG. 4). If so, then the NMS logic 419 continues to block 459. If not, then the NMS logic 419 moves to block 463.

In block 463 the NMS logic 419 shifts the transmit pattern identifier sequence down the list of available transmit pattern identifiers stored in memory 406 by at least one. In this manner, a new transmit pattern identifier sequence is established with which to compare the available receive pattern identifiers. Thereafter, the NMS logic 419 reverts back to block 449 to scan through the receive pattern identifiers once more. Thus, the NMS logic 419 repeats this loop until either a match is found or the available transmit pattern identifier sequences are exhausted in the search.

Assuming, on the other hand, that the NMS logic 419 progresses to block 459, then it determines whether a fault condition variable s is equal to a predetermined value that indicates that synchronization cannot be achieved and the attempt is to be abandoned. If the variable s is equal to the predetermined value, then the NMS logic 419 ends. If not, then the NMS logic 419 proceeds to block 466 where the variable s is incremented accordingly. Thereafter, the NMS logic 419 reverts to block 443 where the process is begun once again. Thus, the NMS logic 419 will only attempt to synchronize after polling the transmit and receive buffers 223 and 273 specific number of times depending upon the variable chosen for s. In the preferred embodiment, this variable may be set equal to 10 or so, although any other value could be employed. The value chosen for s is such that the network management system 129 does not operate too long without synchronization to alert a user of the problem.

In light of the foregoing, the importance of choosing an optimum value for the pattern resolution should be apparent. For example, if the pattern resolution is too small, then the probability is greater that an incorrect sequence match may occur as an individual sequence may be repeated more often. Conversely, a larger pattern resolution would result in greater pattern identifier overhead that must be temporarily stored and communicated to the network management system 129.

In addition, a proper size n of the transmit pattern identifier sequence is preferable. For example, if n is too small, then there is an increased risk that the sequence may be repeated more than once. If n is larger, then the possibility of repetition is reduced, however, the probability that the sequence may not be found due to a dropped data packet in the packet switching network 109 is increased. Thus, values for the pattern resolution and the size n of the transmit pattern identifier sequence are determined with these concepts in mind.

Turning to FIG. 5B, the NMS logic 419 continues with connector A that leads to block 473. Recall that the NMS logic 419 proceeds to this point if a match is found between the transmit pattern identifier sequence and a number of consecutive receive pattern identifiers in the network management system 129. In block 473, a current transmit pattern identifier and a current receive pattern identifier are located. These values are preferably at the end of the transmit pattern identifier sequence and the corresponding end of the matching sequence of receive pattern identifiers since earlier values inherently match due to the fact that synchronization was achieved.

Thereafter, the NMS logic 419 proceeds to block 476 and compares the current transmit pattern identifier with the current receive pattern identifier to determine if they match. The NMS logic 419 then progresses to block 479 in which the NMS logic 419 determines whether the current transmit pattern identifier is the last transmit pattern identifier stored in the memory 406 of the network management system 129. If not, then the NMS logic 419 proceeds to block 483, otherwise the NMS logic 419 moves to block 486. In block 483, if the current transmit and receive pattern identifiers match, then the NMS logic 419 proceeds to block 489. If not, then the NMS logic 419 moves to block 493. In block 489, the NMS logic 419 advances the current transmit and receive pattern identifiers to the next consecutive identifiers, respectively, which presumably were generated by a next consecutive data packet. Thereafter, the NMS logic 419 progresses to block 486.

If a match does not occur in block 483, then the NMS logic 419 progresses to block 493 in which a dropped data packet counter is incremented. The dropped data packet counter ultimately keeps track of the number of data packets that are dropped by the packet switching network 109. This is done because a match was not experienced between the current transmit and receive pattern identifiers, indicating that a data packet failed to reach the receive probe 143 where a current receive pattern identifier corresponding to the current transmit pattern identifier would have been generated had the data packet done so. Thereafter, the NMS logic 419 progresses to block 494 where it is determined if a predetermined number of consecutive dropped packets has occurred. If the predetermined number of consecutive dropped packets occurs, then it is assumed that synchronization has been lost and the NMS logic 419 moves to the connector C that reverts to block 443 (FIG. 5A) to restart the synchronization portion of the NMS logic 419. The predetermined number of consecutive dropped packets may be, for example, twenty or so, although it is understood that any number may be employed depending upon the specific application.

If the predetermined number of consecutive dropped packets has not occurred, then the NMS logic 419 progresses to block 496, where the current transmit pattern identifier is advanced to the next consecutive transmit pattern identifier, while the current receive pattern identifier is left alone. Consequently, given that the previous data packet was dropped by the packet switching network 109, the current transmit pattern identifier and the current receive pattern identifier should now be identical unless another consecutive data packet was dropped. Thereafter, the NMS logic 419 advances to block 486.

In block 486, the NMS logic 419 determines whether the transmit and receive buffers 223 and 273 should be polled from further transmit and receive pattern identifiers. This polling is done at predetermined time intervals that depend in part upon the number of pattern identifiers the transmit and receive buffers 223 and 273 can hold, or in other words, how long the buffers 223 and 273 can last during the transmission of a stream of data packets without overflowing. If the time interval has expired, then the NMS logic 419 progresses to block 499, otherwise it reverts back to block 476. Note if the NMS logic 419 has reached the last transmit pattern identifier in block 479, then the NMS logic 419 will wait until the time interval has expired in block 486.

In block 499, the NMS logic 419 causes the transmit and receive buffers 223 and 273 to be polled to obtain further consecutive transmit and receive pattern identifiers. These are simply added to the bottom of those currently stored in the memory 406 of the network management system 129. The NMS logic 419 then progresses to block 503 in which it is determined whether there are further transmit and receive pattern identifiers to be examined. This may be ascertained by checking whether any further transmit and receive pattern identifiers were received when the transmit and receive buffers 223 and 273 were polled in block 499. If there are further pattern identifiers to process, then the NMS logic 419 reverts back to block 476. If not, then the NMS logic 419 ends.

Turning back to FIGS. 2A and 2B, although the transmit and receive probes 139 (FIG. 1) and 143 (FIG. 1) are shown as being accomplished by software via the transmit probe logic 139*a* and the receive probe logic 143*b*, it is understood that the functionality of the probe logic 139*a*/143*a* and the transmit and receive buffers 223 and 273 may be accomplished using a dedicated logical circuit, or by a combination of software and one or more dedicated logical circuits. The same is understood, with reference to FIG. 4, for the NMS logic 419.

A volatile/nonvolatile memory as specified herein such as the memories 206, 256, and 406 may comprise any combination of volatile and nonvolatile memory components such as solid state random access memory (RAM), solid state read only memory (ROM), or hard drives, etc. Other memory components may include compact disks, floppy disks, magnetic tapes, or other like storage devices mated with the appropriate disk or tape drive to access the data or logic stored thereon. To obtain fast operation, a ROM is preferably employed to store operating logic as will be discussed and a RAM is employed for temporary storage, etc., although a hard drive could be employed in place of the ROM where the operating logic is expansive, the contents of the hard drive being read into a RAM as needed during the operation of the system.

In addition, the flow charts of FIGS. 3, 5A, and 5B show the architecture, functionality, and operation of a possible implementation of the logic employed in the present invention. When implemented in software, each block represents a module, segment, or portion of code, which comprises one or more executable instructions for implementing the specified logical function(s). It should also be noted that in some alternative implementations, the functions noted in the blocks may occur out of the order noted in FIGS. 3, 5A, and 5B. For example, two blocks shown in succession in FIGS. 3, 5A, and 5B may in fact be executed substantially concurrently or the blocks may sometimes be executed in the reverse order, depending upon the functionality involved, as will be further clarified hereinbelow.

Also, with regard to any software implementation of the present invention, such software may comprise an ordered listing of executable instructions for implementing logical functions. Such software may be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (magnetic), a read-only memory (ROM) (magnetic), an erasable programmable read-only memory (EPROM or Flash memory) (magnetic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

Many variations and modifications may be made to the above-described embodiment(s) of the invention without departing substantially from the spirit and principles of the invention. All such modifications and variations are intended to be included herein within the scope of the present invention.

Therefore, having thus described the invention, at least the following is claimed:

1. A network monitoring system for determining service quality over a packet switching network, comprising:

a processor coupled to a local interface;

a memory coupled to the local interface;

operating logic stored in the memory, the operating logic being executed by the processor, the operating logic including:

logic to poll a transmit buffer in a transmit probe for a plurality of transmit pattern identifiers, the plurality of transmit pattern identifiers being generated from a stream of data packets at a transmit side of a packet switching network;

logic to poll a receive buffer in a receive probe for a plurality of receive pattern identifiers, the plurality of receive pattern identifiers being generated from the stream of data packets at a receive side of the packet switching network;

logic to define a transmit sequence of a predetermined size found in the plurality of transmit pattern identifiers, where the predetermined size is greater than one;

logic to find a receive sequence of the predetermined size within the plurality of receive pattern identifiers which matches the transmit sequence;

logic to compare the plurality of transmit pattern identifiers with the plurality of receive pattern identifiers, beginning after the transmit sequence and the receive sequence, to identify at least one dropped data packet from the stream of data packets in the packet switching network.

2. The system of claim 1, wherein the operating logic further includes:

logic to output an error rate to a packet switched network operator, where the error rate is based on a count of the at least one dropped data packet.

3. The system of claim 1, wherein the logic to compare the transmit pattern identifiers with the receive pattern identifiers to identify at least one dropped data packet further comprises logic to detect a missing receive pattern identifier.

4. The system of claim 1, wherein the logic to compare the transmit pattern identifiers with the receive pattern identifiers to identify at least one dropped data packet further comprises:

logic to advance both a current transmit and receive pattern identifiers upon the detection of a match therebetween;

logic to advance the current transmit pattern identifier alone upon detection of a mismatch; and logic to increment a dropped packet counter upon detection of the mismatch.

5. A network monitoring system for determining service quality over a packet switching network, comprising:

means for polling a transmit buffer in a transmit probe for a plurality of transmit pattern identifiers, the plurality of transmit pattern identifiers being generated from a stream of data packets at a transmit side of a packet switching network;

means for polling a receive buffer in a receive probe for a plurality of receive pattern identifiers, the plurality of receive pattern identifiers being generated from the stream of data packets at a receive side of the packet switching network;

means for defining a transmit sequence of a predetermined size found in the plurality of transmit pattern identifiers, where the predetermined size is greater than one;

means for finding a receive sequence of the predetermined size within the plurality of receive pattern identifiers which matches the transmit sequence; and means for comparing the plurality of transmit pattern identifiers with the plurality of receive pattern identifiers, beginning after the transmit sequence and the receive sequence, to identify at least one dropped data packet from the stream of data packets in the packet switching network.

6. The system of claim 5, further comprising:

means for outputting an error rate to a packet switched network operator, where the error rate is based on a count of the at least one dropped data packet.

7. The system of claim 5, wherein means for comparing the transmit pattern identifiers with the receive pattern identifiers to identify at least one dropped data packet further comprises means for detecting a missing receive pattern identifier.

8. The system of claim 5, wherein the means for comparing the transmit pattern identifiers with the receive pattern identifiers to identify at least one dropped data packet further comprises:

means for advancing both a current transmit and receive pattern identifiers upon the detection of a match therebetween;

means for advancing the current transmit pattern identifier alone upon detection of a mismatch; and means for incrementing a dropped packet counter upon detection of the mismatch.

9. A method for determining service quality over a packet switching network, comprising:

polling a transmit buffer in a transmit probe for a plurality of transmit pattern identifiers, the plurality of transmit pattern identifiers being generated from a stream of data packets at a transmit side of a packet switching network;

polling a receive buffer in a receive probe for a plurality of receive pattern identifiers, the plurality of receive pattern identifiers being generated from the stream of data packets at a receive side of the packet switching network;

defining a transmit sequence of a predetermined size found in the plurality of transmit pattern identifiers, where the predetermined size is greater than one;

finding a receive sequence of the predetermined size within the plurality of receive pattern identifiers which matches the transmit sequence; and comparing the plurality of transmit pattern identifiers with the plurality of receive pattern identifiers, beginning after the transmit sequence and the receive sequence, to identify at least one dropped data packet from the stream of data packets in the packet switching network.

10. The method of claim 9, further comprising the step of:

outputting an error rate to a packet switched network operator, where the error rate is based on a count of the at least one dropped data packet.

11. The method of claim 9, wherein the step of comparing the transmit pattern identifiers with the receive pattern identifiers to identify at least one dropped data packet further comprises the step of detecting a missing receive pattern identifier.

12. The method of claim 9, wherein the step of comparing the transmit pattern identifiers with the receive pattern identifiers to identify at least one dropped data packet further comprises the steps of:

advancing both a current transmit and receive pattern identifiers upon the detection of a match therebetween;

advancing the current transmit pattern identifier alone upon detection of a mismatch; and incrementing a dropped packet counter upon detection of the mismatch.

13. The system of claim 1, where the predetermined size is related to a pattern resolution.

14. The system of claim 5, where the predetermined size is related to a pattern resolution.

15. The method of claim 9, where defining the transmit sequence further comprises defining the transmit sequence found in the plurality of transmit pattern identifiers, where the size of the transmit sequence is related to a pattern resolution.

* * * * *